(12) United States Patent
van der Weide et al.

(10) Patent No.: US 7,861,316 B2
(45) Date of Patent: Dec. 28, 2010

(54) MICROSCOPE PROBE HAVING AN ULTRA-TALL TIP

(75) Inventors: Daniel Warren van der Weide, Madison, WI (US); Yaqiang Wang, Carrollton, TX (US)

(73) Assignee: Wisconsin Alumni Research Foundation, Madison, WI (US)

( * ) Notice: Subject to any disclaimer, the term of this patent is extended or adjusted under 35 U.S.C. 154(b) by 611 days.

(21) Appl. No.: 11/608,456

(22) Filed: Dec. 8, 2006

(65) Prior Publication Data
US 2008/0135749 A1   Jun. 12, 2008

(51) Int. Cl.
*G01Q 70/16* (2010.01)
*G01Q 60/00* (2010.01)

(52) U.S. Cl. .......................... 850/60; 850/21
(58) Field of Classification Search ............... 250/306, 250/307; 977/849, 852, 862, 863, 875, 879, 977/888, 890; 850/30, 32, 24, 40, 59
See application file for complete search history.

(56) References Cited

U.S. PATENT DOCUMENTS

| 4,968,585 | A | 11/1990 | Albrecht et al. |
| 5,382,795 | A | 1/1995 | Bayer et al. |
| 5,501,893 | A | 3/1996 | Laermer et al. |
| 5,838,005 | A * | 11/1998 | Majumdar et al. ............. 850/9 |
| 5,936,237 | A * | 8/1999 | van der Weide ............... 850/59 |
| 6,069,018 | A | 5/2000 | Song et al. |
| 6,133,615 | A | 10/2000 | Guckel et al. |
| 6,140,760 | A | 10/2000 | Toyoda et al. |
| 6,383,823 | B1 * | 5/2002 | Takahashi et al. ............ 850/60 |
| 7,078,249 | B2 | 7/2006 | Zhang |
| 7,319,224 | B2 * | 1/2008 | Park et al. .................... 250/306 |
| 2003/0155934 | A1 * | 8/2003 | Moreland et al. ............ 324/629 |
| 2004/0060902 | A1 | 4/2004 | Evans et al. |
| 2006/0073685 | A1 * | 4/2006 | Ghneim et al. ............ 250/443.1 |
| 2007/0062264 | A1 * | 3/2007 | Wang et al. .................... 73/105 |
| 2007/0125961 | A1 * | 6/2007 | Despont ................... 250/492.1 |
| 2007/0178014 | A1 | 8/2007 | Haushalter et al. |

OTHER PUBLICATIONS

Tabib-Azar et al. "Design and Fabrication of Scanning Near-Field Microwave Probes Compatible with Atomic Force Microscopy to Image Embedded Nanostructures," IEEE Transactions on Microwave Theory and Techniques. vol. 52, No. 3 Mar. 2004, pp. 971-979.*

(Continued)

*Primary Examiner*—Jack I Berman
*Assistant Examiner*—Brooke Purinton
(74) *Attorney, Agent, or Firm*—Bell & Manning, LLC

(57) ABSTRACT

A microscope probe including a coaxial tip and a coplanar waveguide (CPW) formed on a silicon substrate is provided. The coaxial tip includes a tip shaft and a tip nib formed from the silicon substrate with the tip nib extending from the tip shaft opposite the silicon substrate. The tip shaft includes a first layer of a first conductive material formed over the silicon substrate, a second layer of an insulating material formed over the first layer, and a third layer of a second conductive material formed over the second layer. The tip nib includes the first layer of the first conductive material formed over the silicon substrate and exposed from the second layer and the third layer of the tip shaft. The CPW includes a center conductor formed from the first layer of the first conductive material and a first and a second outer conductor formed from the second layer of the second conductive material.

14 Claims, 9 Drawing Sheets

OTHER PUBLICATIONS

R & D Foundry, Advanced Processes for Micro and Nano Electro Mechanical Systems and Wafer Level Packaging, brochure, Version 1.0, Institute of Microelectronics, Jan. 1, 2005.

Micro Machining Systems, AMS 100 "I-Speeder" Deep RIE ICP System, brochure, Alcatel, Nov. 20, 2004.

Micro Machining Systems, AMS 200 "I-Speeder" Deep RIE ICP System, brochure, Alcatel, Nov. 20, 2004.

Masakazu Kanechika, Noriaki Sugimoto, and Yasuichi Mitsushima, Control of Shape of Silicon Needles Fabricated by Highly Selective Anisotropic Dry Etching, J. Vac. Sci. Technol. B, vol. 20, No. 4, pp. 1298-1302, Jul./Aug. 2002.

Anja Boisen, Ole Hansen, and Siebe Bouwstra, AFM Probes with Directly Fabricated Tips, J. Micromech. Microeng., vol. 6, pp. 58-62, IOP Publishing Ltd., 1996.

F. M. Serry, P. J. Nagy, J. Horwitz, P.I. Oden, Ph. D., M. G. Heaton, 3D MEMS Metrology with the Atomic Force Microscope, Veeco Metrology Group, Santa Barbara, CA, 2002.

F. M. Serry, M. L. Osborn, T. Ballinger, R. Olds, J. Horwitz, T. Chi, M. G. Heaton, 3D MEMS Metrology with the Stylus Profiler and the Atomic Force Profiler, Veeco Metrology Group, Santa Barbara, CA, 2002.

STS Poly / Si Etcher, Chapter 7.8, pp. 1-8, from http://microlab.berkeley.edu/labmanual/chap7/7.8.html website, printed May 28, 2005.

Massood Tabib-Azar, http://www.njnano.org/pasi/event/talks/tabib2.pdf, Jun. 21, 2004.

Yaqiang Wang and Daniel W. Van Der Weide, Microfabrication and Application of High-aspect-ratio Silicon Tips, J. Vac. Sci. Technol., B vol. 23, No. 4, Jul./Aug. 2005, pp. 1582-1584.

Yaqiang Wang, Charles A. Paulson, Guoqing Ning, and Daniel W. Van Der Weide, Fabrication and Measurements Using Ultra-tall Near-field Coaxial Tips, Microwave Symposium Digest, Jun. 12, 2005, pp. 1-4.

E.I. Givargizov, et al., "Whisker probes," Elsevier Science B.V., Ultramicroscopy 82, Feb. 2000, pp. 57-61.

J. Thaysen, et al., "Atomic Force Microscopy Probe with Piezoresistive read-out and a highly symmetrical Wheatstone Bridge Arrangement," Elsevier Science B.V., Sensors and Actuators 83, May 22, 2000, pp. 47-53.

B. Rosner, et al., "High-frequency Near-field Microscopy," Review of Scientific Instruments, vol. 73, No. 7, Jul. 2002, pp. 2505-2525.

S. Rozhok, et al., "Atomic Force Microscopy of Nickel Dot Arrays with Tuning Fork and Nanotube Probe," J. Vac. Sci. Technol. B 21(1), American Vacuum Society, Jan.-Feb. 2003, pp. 323-325.

T. Morimoto, et al., "Atomic Force Microscopy for High Aspect Ratio Structure Metrology," Jpn. J. Appl. Physics, The Japan Society of Applied Physics, vol. 41, Part 1, No. 6B, Jun. 2002, pp. 4238-4241.

A. Olbrich, et al., "High Aspect Ratio All Diamond Tips Formed by Focused Ion Beam for Conducting Atomic Force Microscopy," American Vacuum Society, J. Vac. Sci.Technol. B 17(4), Jul.-Aug. 1999, pp. 1570-1574.

I.W. Rangelow, et al., "Micromachined Ultrasharp Silicon and Diamond-coated Silicon Tip as a Stable Field-emission Electron Source and a Scanning Probe Microscopy Sensor with Atomic Sharpness," American Vacuum Society, J. Vac.Sci. Technol. B 16(6), Nov.-Dec. 1998, pp. 3185-3191.

M. Tabib-Azar, et al., "Design and Fabrication of Scanning Near-Field Microwave Probes Compatible With Atomic Force Microscopy to Image Embedded Nanostructures," IEEE Transactions on Microwave Theory and Techniques, vol. 52, No. 3, Mar. 2004, pp. 971-979.

J. Park, et al., "Observation of Biological Samples Using a Scanning Microwave Microscope," Elsevier B.V., Ultramicroscopy 102, Oct. 27, 2004, pp. 101-106.

B Rosner, et al., "Microfabricated Silicon Coaxial Field Sensors for Near-field Scanning Optical and Microwave Microscopy," Elsevier Science B.V., Sensors and Actuators A 102, Nov. 5, 2002, pp. 185-194.

A.B.H. Tay, et al., "High-resolution Nanowire Atomic Force Microscope Probe Grown by a Field-emission Induced Process," American Institute of Physics, Applied Physics Letters, vol. 84, No. 25, Jun. 10, 2004, pp. 5207-5209.

A. Imtiaz, et al., "A Novel STM-assisted Microwave Microscope with Capacitance and Loss Imaging Capability," Elsevier Science B.V., Ultramicroscopy 94, Apr. 2003, pp. 209-216.

S. Hosaka, et al., "New AFM Imaging for Observing a High Aspect Structure," Elsevier Science B.V., Applied Surface Science 188, Mar. 28, 2002, pp. 467-473.

* cited by examiner

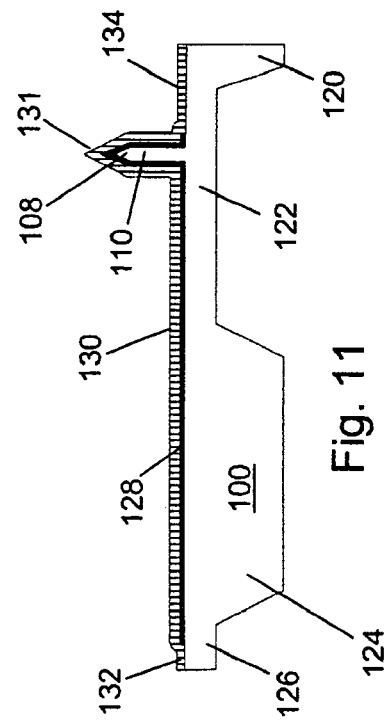
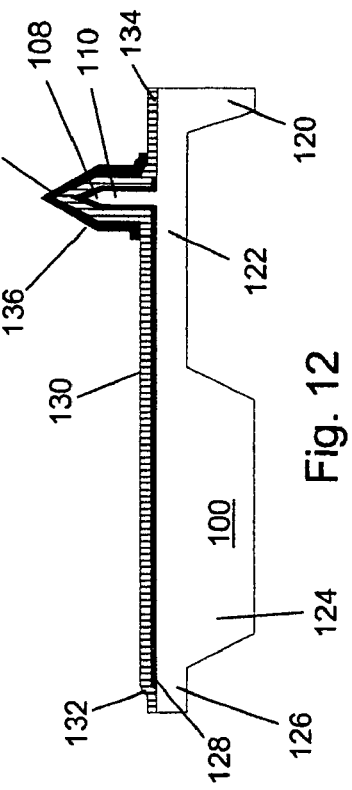
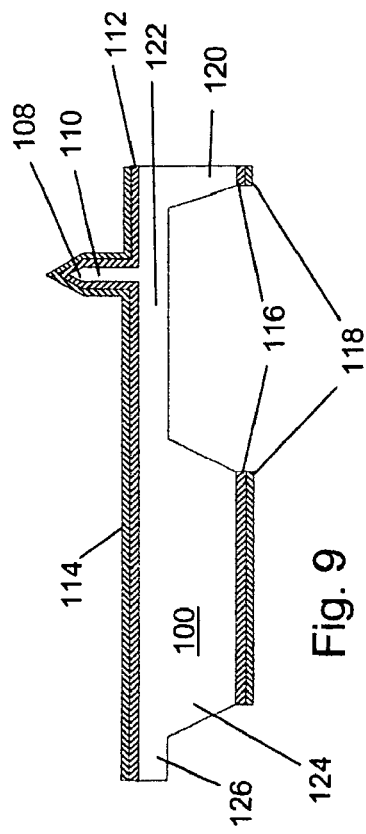
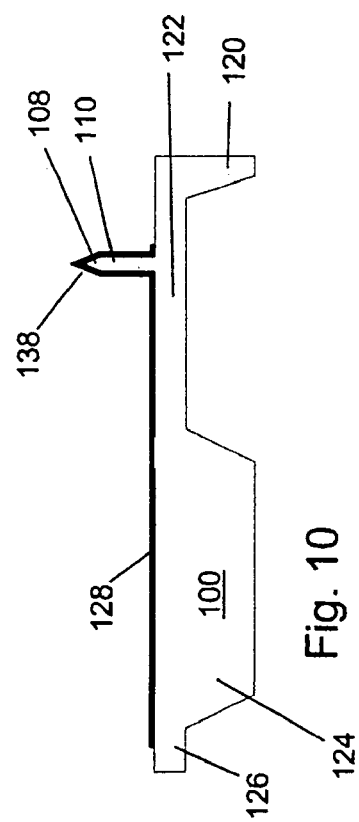

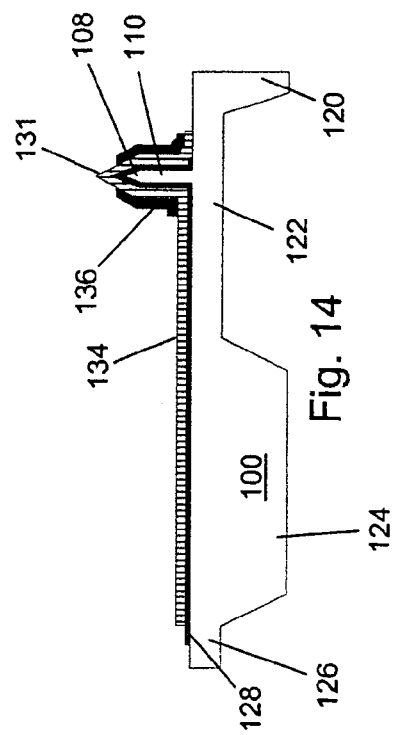
Fig. 13
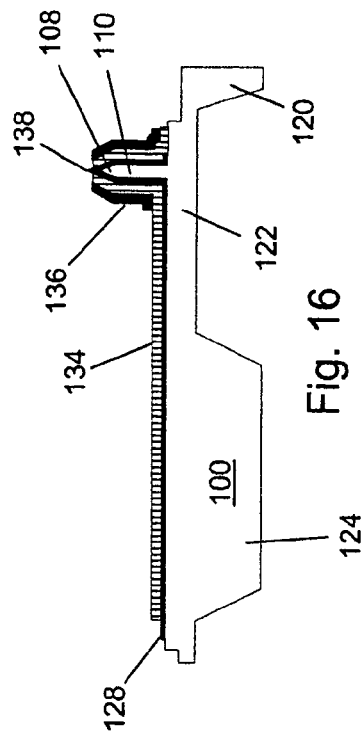
Fig. 14
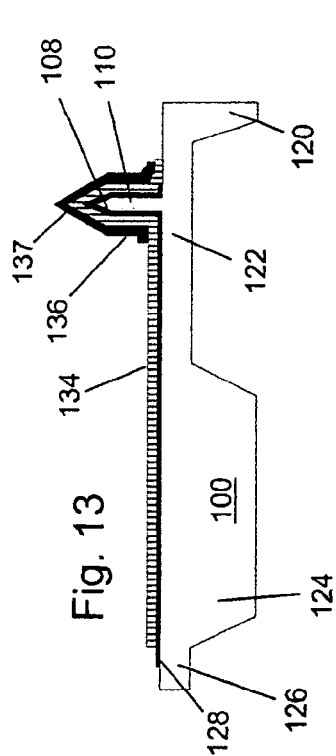
Fig. 15
Fig. 16
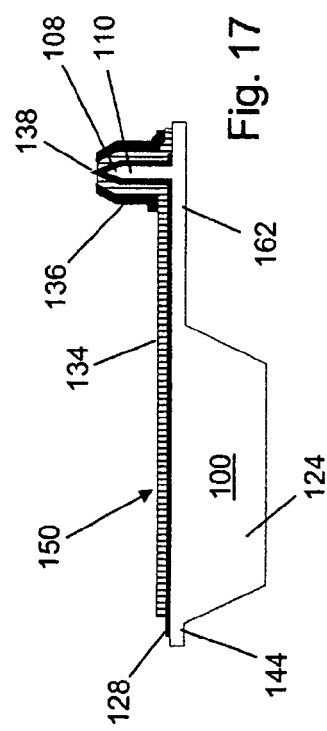
Fig. 17

MICROSCOPE PROBE HAVING AN ULTRA-TALL TIP

REFERENCE TO GOVERNMENT RIGHTS

This invention was made with United States government support awarded by the following agency: USAF/AFOSR F49620-03-1-0420. The United States government has certain rights in this invention.

RELATED APPLICATIONS

The present application is related to U.S. Pat. No. 5,936,237, issued on Aug. 10, 1999, and titled "COMBINED TOPOGRAPHY AND ELECTROMAGNETIC FIELD SCANNING PROBE MICROSCOPE," the disclosure of which is incorporated herein by reference in its entirety. The present application also is related to U.S. patent application Ser. No. 11/150,856, filed on Jun. 10, 2005, and titled "HIGH ASPECT RATIO MICROMECHANICAL PROBE TIPS AND METHODS OF FABRICATION," the disclosure of which is incorporated herein by reference in its entirety.

FIELD OF THE INVENTION

The subject of the disclosure relates generally to the field of micro-electro-mechanical systems (MEMS) and micro-fabrication techniques related to microwave microscope probes. More specifically, the disclosure relates to a probe having an ultra-tall tip and a method of making the probe for use in near-field scanning microwave microscopes.

BACKGROUND OF THE INVENTION

Microfabricated ultra sharp tips may be utilized in various applications, including for example, electrostatic ion sources, atomic force microscopy, and spectroscopy. Very high aspect ratio atomic force microscope (AFM) tips, for example, are necessary to allow deep access to structural features during semi-conductor processing and in the metrology of micro-electro-mechanical systems (MEMS) structures. S. Hosaka, et al., App. Surf. Sci., Vol. 188, 2002, pp. 467 et seq. Various techniques have been developed for the fabrication of high aspect ratio micro-tips. One approach utilizes semiconductor processing techniques to produce ultra-sharp silicon tips. See, I. W. Rangelo, et al., J. Vac. Sci. Technol., Vol. B16, 1998, pp. 3185 et seq.; E. P. Givargizov, et al., Ultramicroscopy, Vol. 82, 2000, pp. 57 et seq.; J. Thaysen, et al., Sens. Actuators, Vol. 883, 2000, pp. 47 et seq. Another approach attaches carbon nanotubes to conventional AFM tips. See, A. Olbreich, et al., J. Vac. Sci. Technol., Vol. B17, 1999, pp. 1570 et seq.; S. Rozhok, et al., J. Vac. Sci. Technol., Vol. B21, 2003, pp. 323 et seq.; A. B. H. Tay and J. T. L. Thong, Appl. Phys. Lett., Vol. 84, 2004, pp. 5207 et seq. Focused ion beam milling has also been utilized to make super-sharp tips, as discussed in, e.g., A. Olbrich, et al., supra, and P. Morimoto, et al., Jpn. J. Appl. Phys., Vol. 41, 2002, pp. 4238 et seq. All of these techniques involve relatively complex processing procedures, with attendant high-costs, and generally are unable to achieve tip heights greater than 30 micrometers (μm), particularly with high aspect ratios of five or greater.

Another application for microfabricated tips has been scanning near-field microwave microscopy (SNMM), which is used to characterize semiconductor materials and to measure biomedical samples. Such near-field techniques allow subwavelength resolution and the penetration of electromagnetic fields to allow imaging of subsurface features. See, e.g., J. Park, et al., Ultra Microscopy, 2005; pp. 101-106; M. Tabib, Azar and Y. Wang, IEEE Trans. Microwave Theory & Tech., Vol. 52, No. 3, March 2004, pp. 971-979; B. T. Rosner and D. W. Van Der Weide, Rev. Sci. Instrum., Vol. 73, 2002, pp. 2505-2525. Coaxial waveguides have the advantage of supporting microwave signals with nearly no cut-off limit and producing highly confined electromagnetic fields through the coaxial structure. A. Kramer, et al., Micron, Vol. 27, December 1996, pp. 413-417. Most existing scanning near-field microwave microscopy probes use open-ended coaxial cables with a protruding center tapered tip or similar coaxial structures. A. Imtiaz, et al., Ultramicroscopy, Vol. 94, 2003, pp. 209-216.

AFM compatible SNMM probes have been developed using MEMS processing techniques. M. Tabib-Azar and Y. Wang, supra; B. T. Rosner, et al., Sens. Actuators A Phys. Vol. 102, December 2002, pp. 185-194. Such tips have the advantage of miniature size with a potential for even greater resolution for batch microfabrication and for compatibility with commercial AFM systems.

U.S. Pat. No. 5,936,237 discloses a combination of a sub-wavelength antenna and a topography probe, both integrated on the same cantilever in a scanning probe microscope. The disclosed combination provides both stimulation/response of a sample via evanescent-wave coupling and acquisition of topographical information in a manner such that the two functions are decoupled from each other. The key component of a microfabricated SNMM probe is a coaxial tip integrated with an AFM cantilever to conduct simultaneous topographic and microwave imaging. Despite successful implementation of microfabricated SNMM probes with coaxial tips, parasitic capacitive coupling with the metallization on the cantilever and the chip body is still a problem that limits coaxial tip microwave imaging. See M. Tabib-Azar and Y. Wang, supra. One approach to this problem is to increase the tip height, thereby decreasing the parasitic capacitance between the cantilever and the sample. This approach has had limited success because of the difficulty of producing microfabricated probe tips with heights greater than about 10 μm.

SUMMARY

Exemplary embodiments described in the present application provide a method for fabricating a microscope probe including a coaxial tip having a height greater than 30 μm. It has proven difficult to etch single pillar micromechanical tips having a height greater than about 20 μm while maintaining a vertical sidewall profile using deep reactive ion etching (DRIE) techniques. Using the exemplary methods described herein, micromechanical tips having heights greater than 30 μm can be obtained while maintaining the vertical sidewall necessary for both AFM and SNMM profiling applications. A coaxial tip is formed from the tip and integrated with a coplanar waveguide on a single silicon substrate to form a microscope probe that is better suited than conventional tips for MEMS metrology in measuring the topography and surface smoothness and in obtaining high resolution of the three-dimensional features of MEMS devices with heights up to tens of microns. The microscope probe formed using exemplary embodiments described in the present application reduces crosstalk between the probe chip body and the sample being analyzed and enables deep access to the sample. Additionally, more than 400 probes can be batch fabricated on a four-inch silicon wafer overcoming the prior art complex processing procedures and attendant high-costs.

An exemplary microscope probe includes, but is not limited to, a coaxial tip and a coplanar waveguide (CPW) formed on a silicon substrate. The coaxial tip includes a tip shaft and a tip nib formed from the silicon substrate with the tip nib extending from the tip shaft opposite the silicon substrate. The tip shaft includes a first layer of a first conductive material formed over the silicon substrate, a second layer of an insulating material formed over the first layer, and a third layer of a second conductive material formed over the second layer. The tip nib includes the first layer of the first conductive material formed over the silicon substrate and exposed from the second layer and the third layer of the tip shaft. The CPW includes a center conductor formed from the first layer of the first conductive material and a first and a second outer conductor formed from the second layer of the second conductive material.

In an exemplary method of forming the microscope probe, an island is formed on a surface of a silicon substrate. The island includes an etchant protective layer. The silicon substrate is isotropically etched, by reactive ion etching, around the island and beneath the island to form a tip nib. The silicon substrate is anisotropically etched, by deep reactive ion etching, around the island and a portion of the silicon substrate below the island to a desired depth to form a tip shaft extending from the tip nib. The island is removed from the tip nib. The silicon substrate is patterned to form a probe support and a cantilever beam, the cantilever beam extending from the probe support to a first support. A first layer of a first conductive material is deposited over the tip nib and the tip shaft and over a portion of the cantilever beam and the probe support to form a center conductor of a coplanar waveguide. A second layer of an insulating material is deposited over the first layer. A third layer of a second conductive material is deposited over the tip nib and the tip shaft and over a portion of the cantilever beam and the probe support to form a first outer conductor and a second outer conductor of the coplanar waveguide. A portion of the third layer is etched to expose a portion of the second layer above the tip nib. The exposed portion of the second layer is etched to expose a portion of the first layer above the tip nib thereby forming a coaxial tip.

Other principal features and advantages of the invention will become apparent to those skilled in the art upon review of the following drawings, the detailed description, and the appended claims.

BRIEF DESCRIPTION OF THE DRAWINGS

Exemplary embodiments of the invention will hereafter be described with reference to the accompanying drawings, wherein like numerals will denote like elements.

FIG. 9 is a side view as in FIG. 4 after an initial backside etching and patterning to form a probe support, a cantilever beam, and a first support of the probe tip in accordance with an exemplary embodiment.

FIG. 10 is a view as in FIG. 9 after depositing a first conductive layer on the tip nib, the tip shaft, and the top surface of the silicon substrate in accordance with an exemplary embodiment.

FIG. 11 is a view as in FIG. 10 after depositing an insulating layer on the first conductive layer in accordance with an exemplary embodiment.

FIG. 12 is a view as in FIG. 11 after depositing a second conductive layer on the tip nib and the tip shaft in accordance with an exemplary embodiment.

FIG. 13 is a view as in FIG. 12 after an isotropic reactive ion etch removing edges of the insulating layer in accordance with an exemplary embodiment.

FIG. 14 is a view as in FIG. 13 after applying a patterned photoresist and etching exposed areas not covered by the photoresist in accordance with an exemplary embodiment.

FIG. 15 is a view as in FIG. 14 after an oxide etch to expose the tip nib covered by the first conductive layer in accordance with an exemplary embodiment.

FIG. 16 is a view as in FIG. 15 after an etch to remove edges of the silicon substrate in accordance with an exemplary embodiment.

FIG. 17 is a view as in FIG. 16 after a further backside etch to release the probe from the silicon substrate in accordance with an exemplary embodiment.

DETAILED DESCRIPTION

Figure 1:
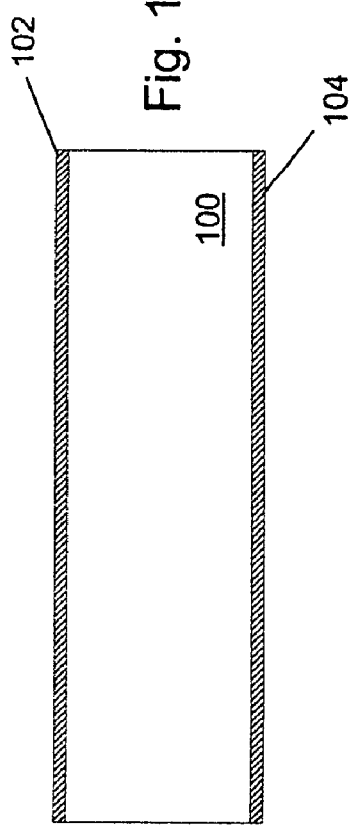
FIG. 1 is a side view of a silicon substrate in accordance with an exemplary embodiment.
Figure 2:
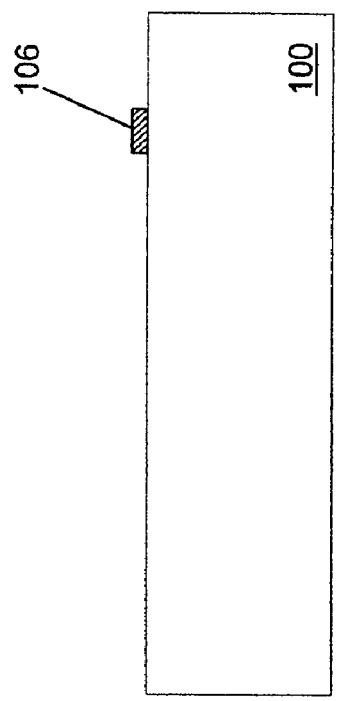
FIG. 2 is a side view as in FIG. 1 after an isotropic wet etch forming an island on the silicon substrate in accordance with an exemplary embodiment.
Figure 3:
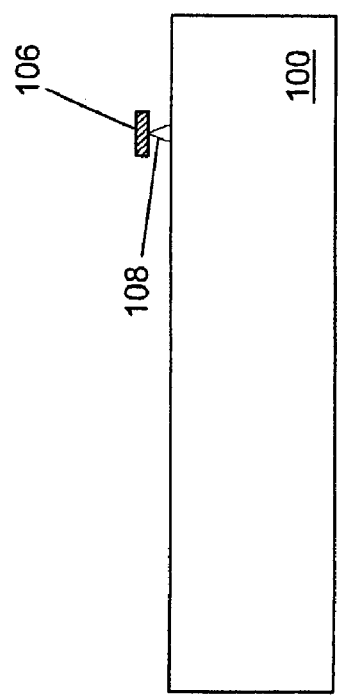
FIG. 3 is a side view as in FIG. 2 after an isotropic reactive ion etch forming a tip nib of a probe tip in accordance with an exemplary embodiment.

Batch fabrication of microscope probes integrated with high aspect ratio tips is illustrated in FIGS. 1-4 and 9-17. With reference to FIG. 1, a 1 μm thick thermal oxide (i.e, $SiO_2$) is grown on a top side 102 and a backside 104 of a Si wafer 100. In an exemplary embodiment, Si wafer 100 has a resistivity of 5000 Ω·cm. With reference to FIG. 2, an island 106 of oxide is formed using standard photolithography and a buffered hydrofluoric (BHF) acid etch. In an exemplary embodiment, island 106 has a 16 μm-diameter. With reference to FIG. 3, the exposed Si is etched by reactive ion etch (RIE) ($SF_6$, 45 standard cubic centimeters per minute (sccm), 50 milliTorr (mTorr), 100 watt (W)) around island 106 and beneath island 106 to form a tip nib 108. Alternatively, wet etching can be performed through use of an HNA solution mixture (i.e. $HNO_3$:$CH_3COOH$:HF (1:3:8 in volume ratio)). The etching selectivity of silicon in comparison with silicon dioxide is lower, however.

Figure 4:
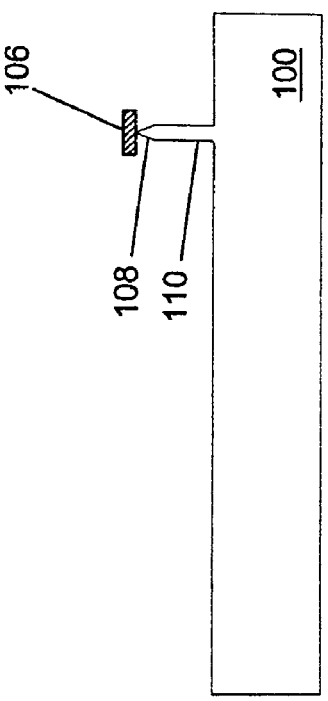
FIG. 4 is a side view as in FIG. 3 after an anisotropic deep reactive ion etch forming a shaft of the probe tip in accordance with an exemplary embodiment.

With reference to FIG. 4, a DRIE process is performed, for example, using a commercial STS® Multiplex ICP system (Surface Technology Systems, Redwood City, Calif.) to form a tip shaft 110. The process starts from a $C_4F_8$ deposition (85 sccm, 6 seconds, APC 66°, RF 600 W), which alternates with $SF_6$ etching steps (130 sccm, 8 seconds, APC 66°, RF 600 W). Because DRIE generates characteristic scalloping features on the sidewall of the tip shaft, an $SF_6/O_2$ etching ($SF_6$ 45 sccm, $O_2$ 5 sccm, 50 mTorr, 100 W) may be used to form a smooth sidewall and desired tip shaft diameter after a wet chemical solution ($H_2SO_4:H_2O_2$ (4:1 in volume ratio)) cleans the tip wafer. Island 106 is removed with hydrofluoric acid. Tip nib 108 is sharpened by oxidation sharpening at 950° C. to form a sharpened tip nib 108. In an exemplary embodiment, oxidation sharpening uses a wet oxidation at 950° C. in a silica furnace for 4 hours to get 600 nanometers (nm) of silicon dioxide. Using other substrate materials, oxidation sharpening is not applicable. Instead, a wet etching method can be used if necessary.

Figure 6:
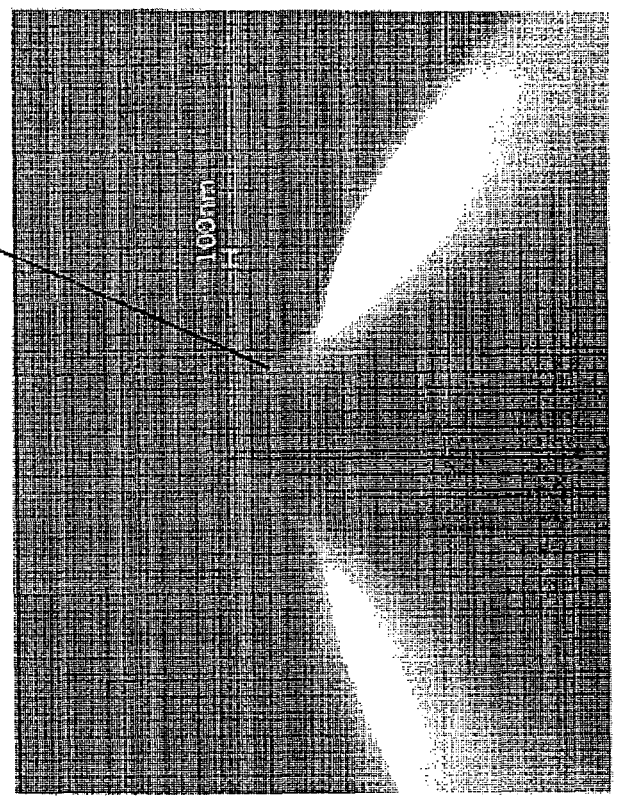
FIG. 6 is a detailed micrograph of the tip nib of the probe tip in accordance with the first exemplary embodiment.
Figure 5:
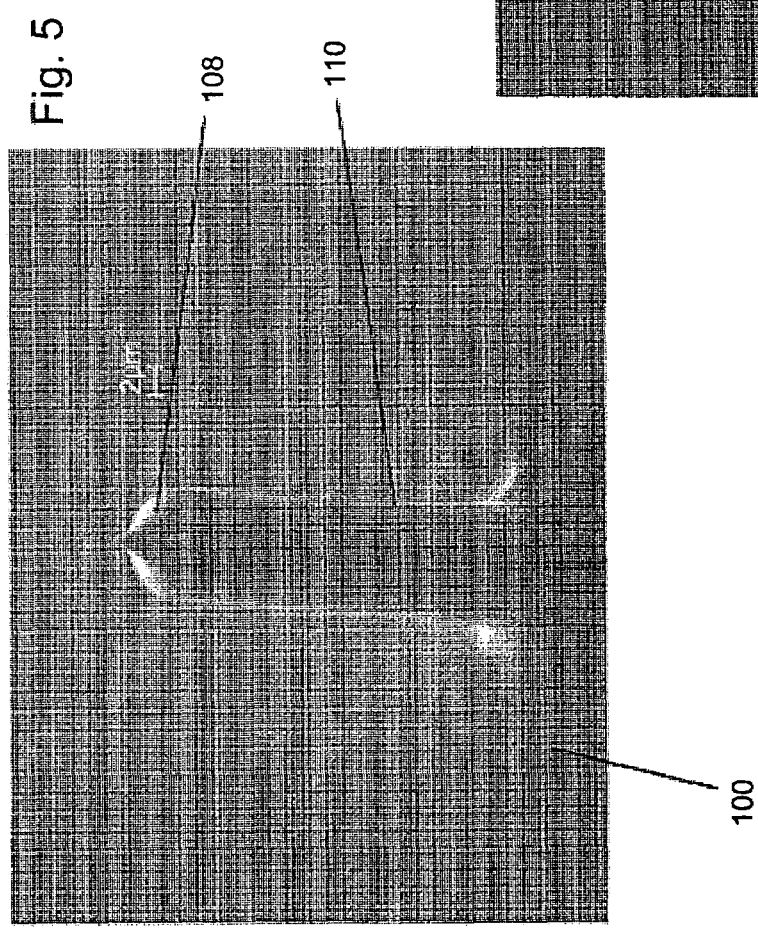
FIG. 5 is a perspective micrograph view of the probe tip in accordance with a first exemplary embodiment.
Figure 8:
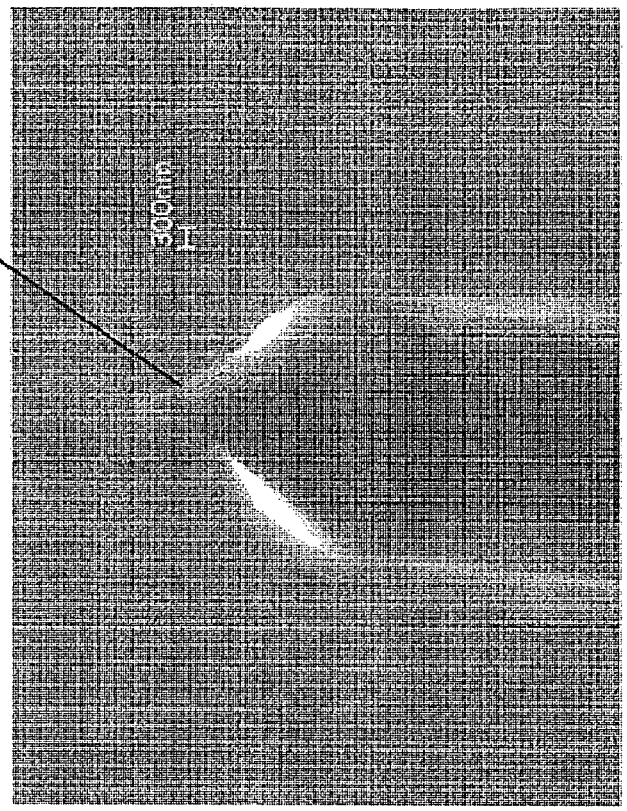
FIG. 8 is a detailed micrograph of the tip nib of the probe tip in accordance with the second exemplary embodiment.
Figure 7:
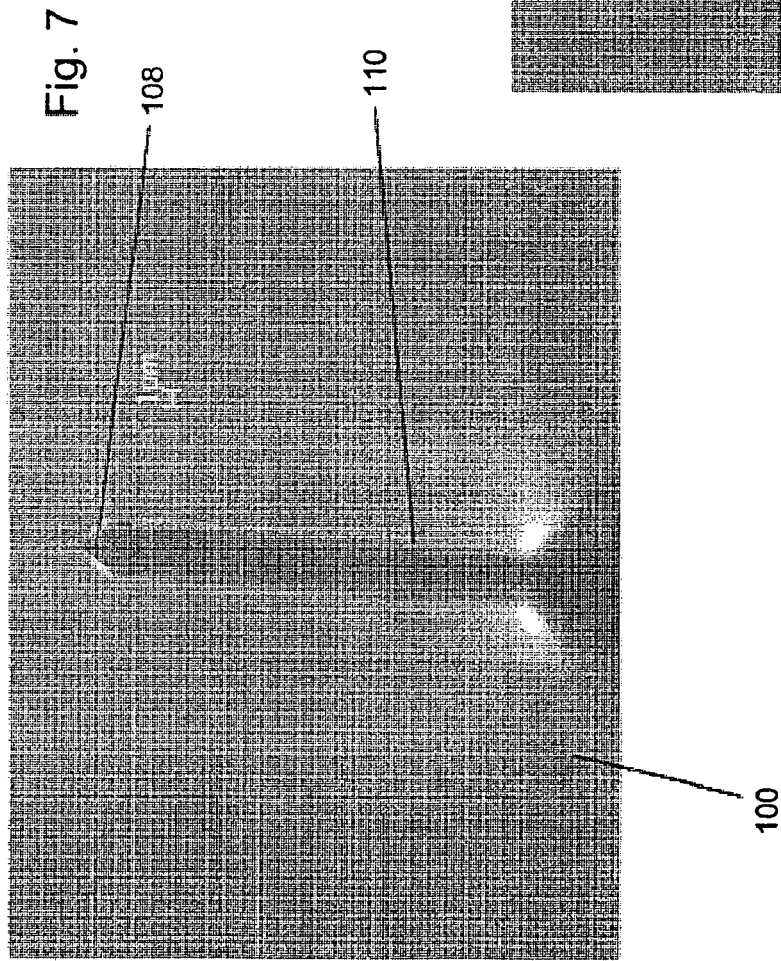
FIG. 7 is a perspective micrograph view of the probe tip in accordance with a second exemplary embodiment.

FIG. 5 shows a micrograph of a microfabricated high aspect ratio tip using the method described with reference to FIGS. 1-4 in accordance with a first exemplary embodiment. The height of the tip is 52 μm with an aspect ratio (the ratio of tip height to tip shaft width) of 8:1. FIG. 6 is a closer view of the tip nib 108 of the tip of FIG. 5 having a tip point radius estimated to be approximately 30 nm. FIG. 7 shows a micrograph of a microfabricated high aspect ratio tip using the method described with reference to FIGS. 1-4 in accordance with a second exemplary embodiment. The height of the tip is 45 μm with an aspect ratio of 10:1. FIG. 8 is a closer view of the tip nib 108 of the tip of FIG. 7 having a tip point radius estimated to be approximately 50 nm. The major process cost comes from the STS DRIE process, which is comparatively low using a high silicon etch rate and batch processing. The tip height can be larger than 100 μm using this method, and is limited only in the etch selectivity of silicon versus the silicon dioxide protective island during the RIE and DRIE steps.

Other commercial DRIE equipment may also be used in this process. For example, the PlasmaTherm SLR-770 Ion Etcher and the Alcatel 601E ICP etchers may be used. Generally, high aspect ratio tip etching can be carried out on larger area substrates after tip mask patterning (e.g., on 4-inch or larger wafers): First, isotropic RIE is used to achieve the desired tip precursor. Second, an STS recipe with a strong passivation cycle is used for 5-10 minutes to enable the tip shaft to maintain a vertical sidewall (e.g., etch cycle: 105 sccm $SF_6$, 10.5 seconds, 8 W platen power; passivation cycle: 95 sccm $C_4F_8$, 10 seconds, 6 W platen power; RF coil power 600 W and APC 50-degree in both cycles). Third, a more aggressive STS recipe continues the tip shaft etching until achieving the desired shaft length (etch cycle: 130 sccm $SF_6$ and 13 sccm O2, 10 seconds, 9 W platen power; passivation cycle: 110 sccm $C_4F_8$, 9 seconds, 0 W platen power; RF coil power is 600 W and fix chamber pressure to be around 20 mTorr during both cycles, $H_2SO_4:H_2O_2$ (4:1) solution cleans the tip wafer). Steps to smooth the shaft sidewall, and sharpen the tip can be performed as discussed above. A similar process can be used for fabricating tips on different substrate materials such as GaAs. Available commercial tools are PlasmaTherm 770 ECR or Omega® 201 ICP system from Trikon Technologies Ltd, Newport, United Kingdom. The GaAs substrate may be cleaned by $NH_4OH:H_2O_2:H_2O$ (1:1:5) solution (75° C. heated).

With reference to FIG. 9, $Si_3N_4$ film 112 is deposited on the top side of Si wafer 100 by Low Pressure Chemical Vapor Deposition (LPCVD). $SiO_2$ film 114 is deposited on $Si_3N_4$ film 112. $Si_3N_4$ film 116 is patterned on the backside of Si wafer 100 by LPCVD. $SiO_2$ film 118 is deposited on $Si_3N_4$ film 116. A cantilever cavity and an attachment lever cavity are opened on the backside of the wafer by photolithography and RIE. The wafer is etched in potassium oxide (KOH) solution to form the probe chip bodies as illustrated in FIG. 9. The probe chip body includes a first support 120, an initial cantilever beam 122, a probe support 124, and an attachment support 126. Initial cantilever beam 122 is etched by RIE using a photoresist (PR) as a mask layer to a desired thickness to form a cantilever beneath tip shaft 110. First support 120 extends from a first side of initial cantilever beam 122. Probe support 124 extends from a second side of initial cantilever beam 122, opposite the first side of initial cantilever beam 122. Attachment support 126 extends from a first side of probe support 124 opposite initial cantilever beam 122.

With reference to FIG. 10, a photolithographic pattern for a center conductor of a CPW is patterned on the top side of Si wafer 100. The first conductive layer 128 may be patterned by photolithography using negative-tone SU-8 resist. A first conductive material is deposited on the top side to cover tip nib 108 and tip shaft 110 forming the inner conductor of a coaxial tip structure and the center conductor of the CPW. In an exemplary embodiment, a 300-nm-thick Cr film is deposited. First conductive material of first conductive layer 128 may include chromium, gold, etc. Extraneous portions of first conductive layer 128 are removed from the top side of Si wafer 100 as a result of the lithographic pattern. A conductive tip nib 138 of first conductive layer 128 covers tip nib 108.

With reference to FIG. 11, an insulation layer 130 for the coaxial tip is deposited on the top side of Si wafer 100. A 1-μm-thick $SiO_2$ film may be deposited by plasma enhanced chemical vapor deposition (PECVD). A first end 132 of insulation layer 130 extends over first conductive material 128 above attachment support 126. A second end 134 of insulation layer 130 extends over first conductive layer 128 opposite first end 132 of insulation layer 130 and above first support 120. An insulated tip nib 131 of insulation layer 130 covers conductive tip nib 138.

With reference to FIG. 12, a photolithographic pattern for a first outer conductor and a second outer conductor of the CPW is patterned on the top side of Si wafer 100. A second conductive layer 136 is deposited on the top side to cover tip nib 108 and tip shaft 110 forming the outer shield of the coaxial tip structure and the first outer conductor and the second outer conductor of the CPW. The second conductive layer 136 may be applied as a 1-μm-thick film deposited by sputtering. The second conductive layer 136 may be patterned by another SU-8 photolithography step and etched to form the shield pattern and outer conductors of the CPW. Second conductive layer 136 may include chromium, gold, etc. Extraneous portions of second conductive layer 136 are removed from the top side of Si wafer 100 as a result of the lithographic pattern. A second conductive tip nib 137 of second conductive layer 136 covers insulated tip nib 131.

A photolithographic pattern is patterned on the top side of Si wafer 100. With reference to FIG. 13, the exposed first end 132 of insulation layer 130 and the exposed second end 134 of insulation layer 130 are etched by PECVD Oxide etch. To fabricate the coaxial tip, a tip-exposure process is performed that consists of a thick resist coating by AZ 4620 and a Cr wet etch to remove second conductive tip nib 137 as shown with reference to FIG. 14. With reference to FIG. 15, insulated tip nib 131 is removed using a PECVD Oxide etch to form a coaxial tip 154. In an exemplary embodiment, the opening aperture radius formed by the etched second conductive tip nib 137 and insulated tip nib 131 is ~3 μm. The microscope probe 150 is released by a backside RIE with a thick PR coating on the front side of the wafer, as illustrated in FIGS. 16 and 17, to remove first support 120, to reduce the depth of initial cantilever beam 122 to form a cantilever beam 162, and to remove a portion of attachment support 126 to form an attachment lever 144.

Figure 18:
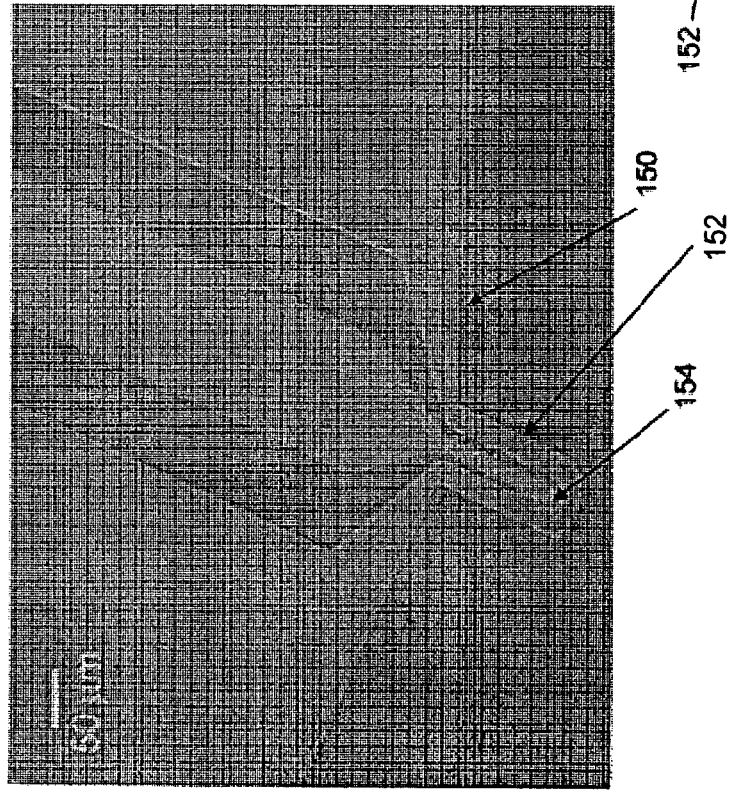
FIG. 18 is a photomicrograph perspective view of a microscope probe in accordance with a first exemplary embodiment.
Figure 19:
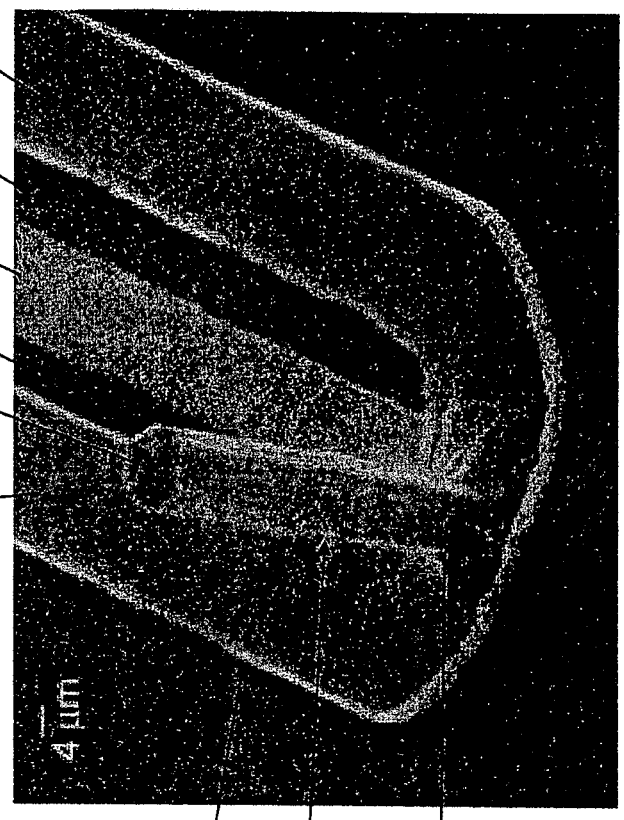
FIG. 19 is a detailed photomicrograph perspective view of the microscope probe of FIG. 18.
Figure 20:
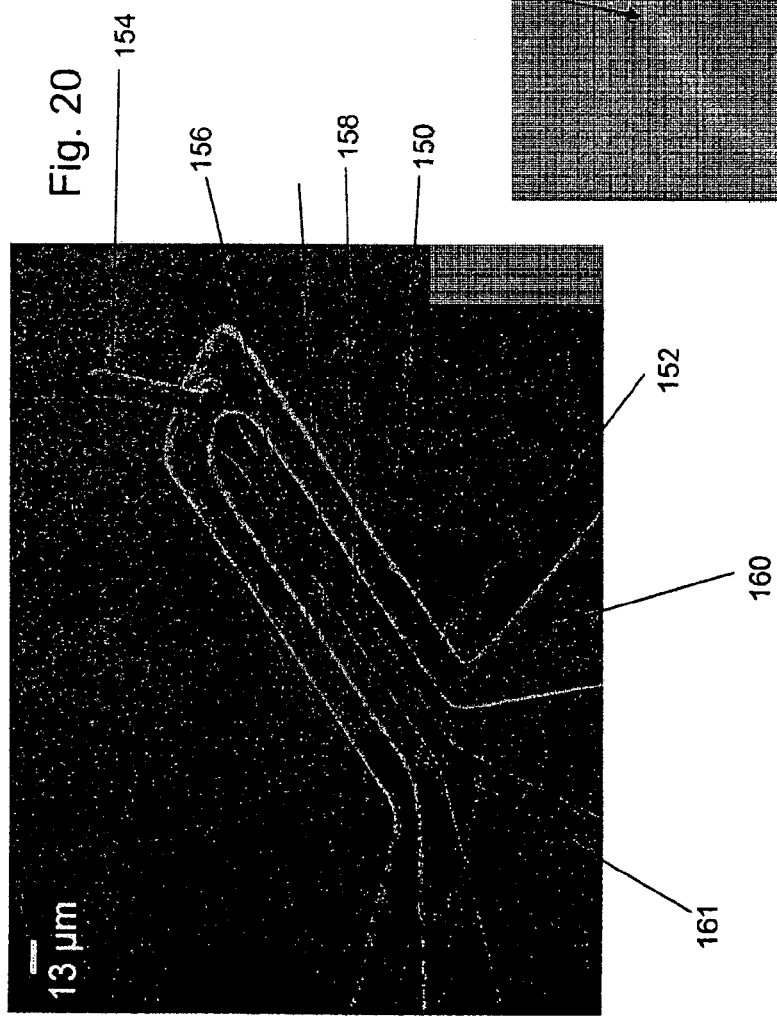
FIG. 20 is a photomicrograph perspective view of a microscope probe in accordance with a second exemplary embodiment.
Figure 21:
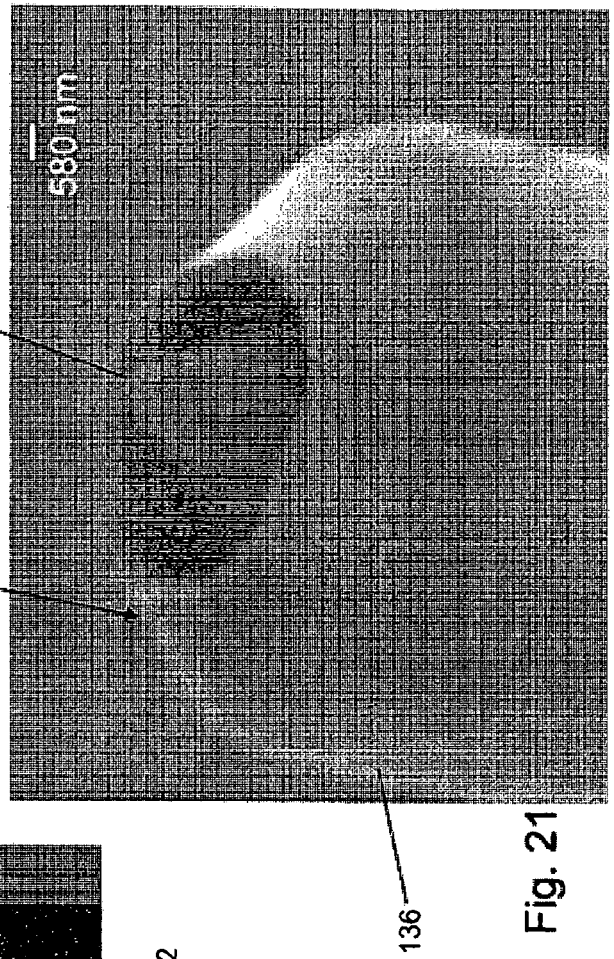
FIG. 21 is a detailed photomicrograph perspective view of the microscope probe of FIG. 20.
Figure 23:
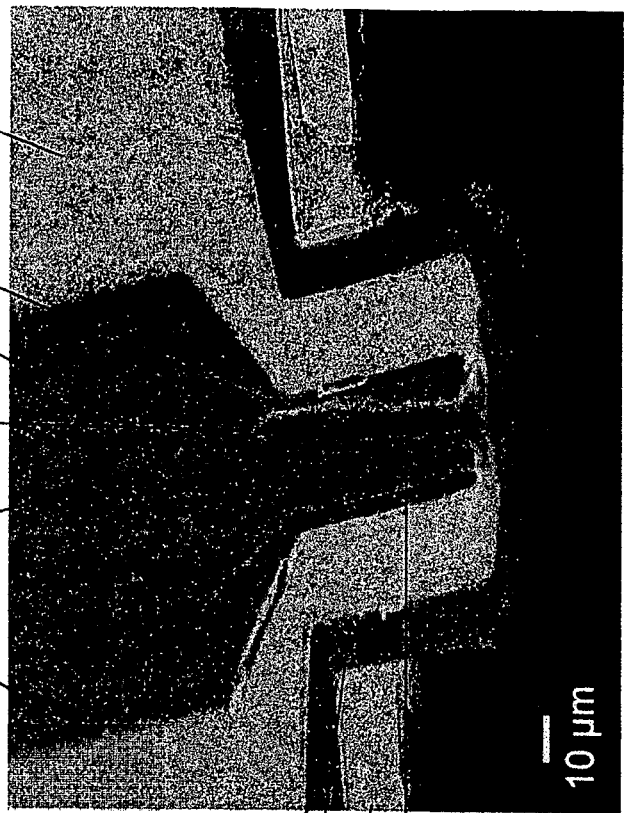
FIG. 23 is a detailed photomicrograph perspective view of the released microscope probe of FIG. 22.
Figure 22:
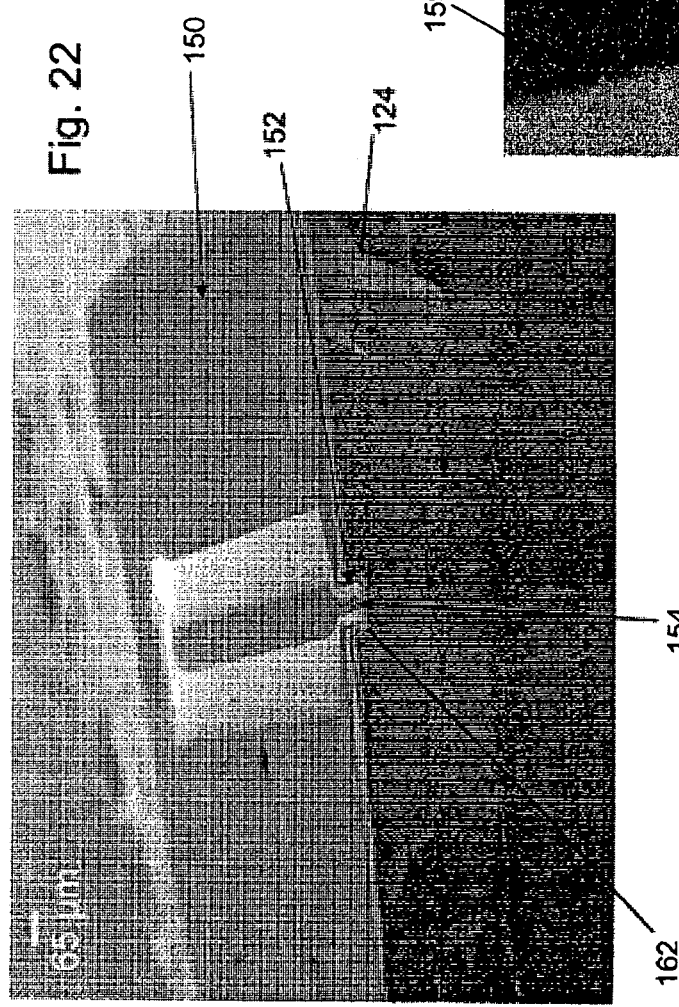
FIG. 22 is a photomicrograph perspective view of a released microscope probe in accordance with an exemplary embodiment.

FIG. 18 shows an SEM micrograph of a microscope probe 150 with a CPW 152 and a coaxial tip 154 in a first exemplary embodiment. FIG. 19 shows a closer view of the microscope probe 150 of FIG. 18. CPW 152 may include a center conductor 156, a first insulator 158, a second insulator 159, a first outer conductor 160, and a second outer conductor 161. First insulator 158 and second insulator 159 are positioned on either side of center conductor 156. First insulator 158 separates center conductor 156 and first outer conductor 160. Second insulator 159 separates center conductor 156 and second outer conductor 161. FIG. 20 shows an SEM micrograph of a microscope probe 150 with a CPW 152 and a coaxial tip 154 in a second exemplary embodiment. FIG. 21 shows a closer view of the microscope probe 150 of FIG. 20. FIG. 22 shows an SEM micrograph of a microscope probe 150 released from the Si wafer. FIG. 23 shows a closer view of the released microscope probe 150 of FIG. 22. The released probe includes a probe support 124 and cantilever beam 162. On cantilever beam 162, a typical CPW center conductor width may be approximately 10 μm and typical insulator widths may be approximately 10 μm. On Si wafer 100, CPW center conductor width may be approximately 100 μm and typical insulator widths may be approximately 60 μm.

Figure 24:
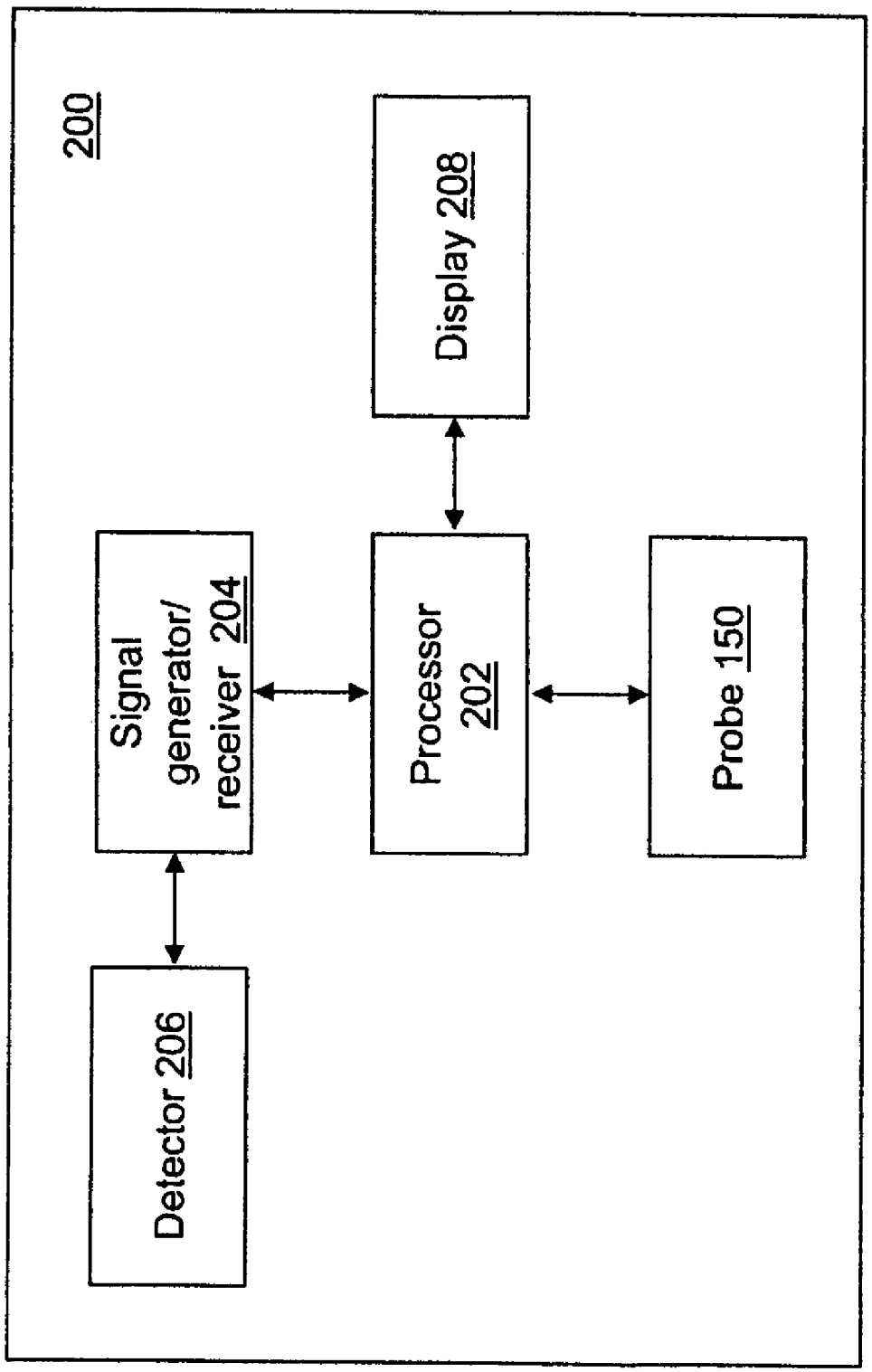
FIG. 24 is a block diagram of a scanning near-field microwave microscopy system utilizing a coaxial probe tip in accordance with an exemplary embodiment.

In an exemplary embodiment, a block diagram of an SNMM system 200 is illustrated in FIG. 24. SNMM system 200 utilizes microscope probe 150 to scan a surface of a sample. SNMM system 200 may include a processor 202, a signal generator 204, a detector 206, and a display 208. Signal generator 204 generates a signal to control a position of microscope probe 150 relative to the sample. Detector 206 receives and processes an output signal from CPW 152 of microscope probe 150. The output signal is transmitted to CPW 152 from coaxial tip 154. Processor 202 receives the processed output signal, controls the display of images of the processed data on display 208, and controls relative movement between microscope probe 150 and the sample. Microscope probe 150 moves relative to the sample. In an exemplary embodiment, processor 202 moves microscope probe 150. In another exemplary embodiment, processor 202 moves the sample. Coaxial tip 154 mounted at the end of cantilever beam 162 bends in response to the force between conductive tip nib 138 and the sample. Reflected laser light may be used to detect the motion of conductive tip nib 138. Coaxial tip 154 is better suited than conventional tips for MEMS metrology to measure the topography and surface smoothness and to obtain high resolution of the three-dimensional features of MEMS devices with heights up to tens of microns.

The foregoing description of exemplary embodiments of the invention have been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A microscope probe, the probe comprising:
a coaxial tip and a coplanar waveguide formed on a silicon substrate, wherein the silicon substrate includes a probe support and a cantilever beam extending from the probe support;
the coaxial tip comprising
a tip shaft formed from the silicon substrate and extending from the silicon substrate near a first edge of the cantilever beam opposite the probe support; and
a tip nib formed from the silicon substrate and extending from the tip shaft opposite the silicon substrate;
wherein the tip shaft includes a first layer of a first conductive material formed over the silicon substrate, a second layer of an insulating material formed over the first layer, and a third layer of a second conductive material formed over the second layer; and
further wherein the tip nib includes the first layer of the first conductive material formed over the silicon substrate and exposed from the second layer and the third layer of the tip shaft; and
the coplanar waveguide comprising
a center conductor formed from the first layer of the first conductive material and extending from the tip shaft along the cantilever beam and along the probe support;
a first outer conductor formed from the second layer of the second conductive material and extending from the tip shaft along the cantilever beam and along the probe support; and
a second outer conductor formed from the second layer of the second conductive material and extending from the tip shaft along the cantilever beam and along the probe support.

2. A scanning microscope, the scanning microscope comprising:
a microscope probe comprising
a coaxial tip and a coplanar waveguide formed on a silicon substrate, wherein the silicon substrate includes a probe support and a cantilever beam extending from the probe support;
the coaxial tip comprising
a tip shaft formed from the silicon substrate and extending from the silicon substrate near a first edge of the cantilever beam opposite the probe support; and
a tip nib formed from the silicon substrate and extending from the tip shaft opposite the silicon substrate;
wherein the tip shaft includes a first layer of a first conductive material formed over the silicon substrate, a second layer of an insulating material formed over the first layer, and a third layer of a second conductive material formed over the second layer; and
further wherein the tip nib includes the first layer of the first conductive material formed over the silicon substrate and exposed from the second layer and the third layer of the tip shaft; and
the coplanar waveguide comprising
a center conductor formed from the first layer of the first conductive material and extending from the tip shaft along the cantilever beam and along the probe support;
a first outer conductor formed from the second layer of the second conductive material and extending from the tip shaft along the cantilever beam and along the probe support; and a second outer conductor formed from the second layer of the second conductive material and extending from the tip shaft along the cantilever beam and along the probe support;

a signal generator capable of generating a signal to control a position of the microscope probe relative to a sample;

a detector capable of receiving and of processing an output signal from the coplanar waveguide of the microscope probe, the output signal transmitted to the coplanar waveguide from the coaxial tip; and a processor operably coupled with the signal generator, the detector, and the microscope probe to receive the processed output signal.

3. A method of forming a microscope probe, the method comprising:

forming an island on a surface of a silicon substrate wherein the island comprises an etchant protective layer;

isotropically etching the silicon substrate, by reactive ion etching, around the island and beneath the island to form a tip nib;

anisotropically etching, by deep reactive ion etching, the silicon substrate around the island and a portion of the silicon substrate below the island to a desired depth to form a tip shaft extending from the tip nib;

removing the island from the tip nib;

patterning the silicon substrate to form a probe support and a cantilever beam, the cantilever beam extending from the probe support to a first support;

depositing a first layer over the tip nib and the tip shaft and over a portion of the cantilever beam and the probe support to form a center conductor of a coplanar waveguide, the first layer comprising a first conductive material;

depositing a second layer over the first layer, the second layer comprising an insulating material;

depositing a third layer over the tip nib and the tip shaft and over a portion of the cantilever beam and the probe support to form a first outer conductor and a second outer conductor of the coplanar waveguide, the third layer comprising a second conductive material;

etching a portion of the third layer to expose a portion of the second layer above the tip nib; and etching the exposed portion of the second layer to expose a portion of the first layer above the tip nib to form a coaxial tip.

4. The method of claim 3, wherein the first conductive material and the second conductive material are the same material.

5. The method of claim 3, wherein the first conductive material and the second conductive material are materials selected from the group consisting of chromium and gold.

6. The method of claim 3, further comprising sharpening the tip nib before depositing the first layer over the tip nib and the tip shaft.

7. The method of claim 3, wherein etching the portion of the third layer comprises coating the third layer with a photoresist coating and isotropically etching the third layer, by reactive ion etching.

8. The method of claim 3, wherein patterning the silicon substrate comprises:

depositing a fourth layer over a top side of the silicon substrate wherein the coaxial tip is formed on the top side;

depositing a fifth layer over the fourth layer;

depositing a sixth layer over a backside of the silicon substrate to form a protective layer below the probe support and the first support, wherein the backside is opposite the top side of the silicon substrate;

depositing a seventh layer over the sixth layer;

isotropically etching the silicon substrate, by reactive ion etching, around the sixth layer and the seventh layer; and anisotropically etching, by potassium hydroxide etching, the silicon substrate around the sixth layer and the seventh layer to a desired depth to form a cantilever cavity in the silicon substrate below the tip shaft and an attachment lever, the attachment lever formed at a first end of the silicon substrate opposite the first support.

9. The method of claim 8, further comprising releasing the probe from the silicon substrate.

10. The method of claim 9, wherein releasing the probe from the silicon substrate comprises isotropically etching the silicon substrate, by reactive ion etching, to remove the first support and to reduce the depth of the cantilever beam.

11. The method of claim 10, wherein releasing the probe from the silicon substrate further comprises isotropically etching the silicon substrate, by reactive ion etching, to reduce the depth of the attachment lever.

12. The method of claim 3, wherein forming the island on the silicon substrate comprises:

forming a layer of silicon dioxide on a surface of the silicon substrate;

lithographically patterning the silicon dioxide layer with a photoresist, the photoresist covering the island;

etching the silicon dioxide layer around the island protected by the photoresist; and removing the photoresist.

13. The method of claim 3, wherein a width of the tip shaft is approximately less than or equal to ten micrometers.

14. The method of claim 3, wherein a length of the tip shaft and the tip nib is approximately greater than or equal to thirty micrometers.

* * * * *